P. PHILLIPS.
SEPARABLE FASTENER.
APPLICATION FILED MAR. 9, 1911.
1,068,530.
Patented July 29, 1913.
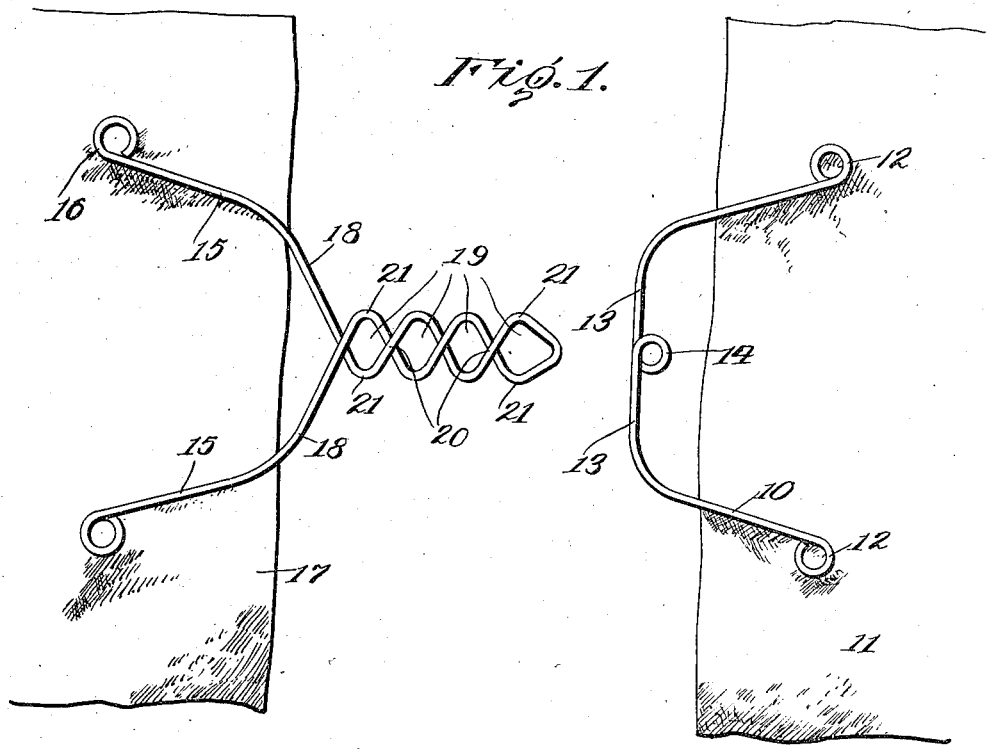
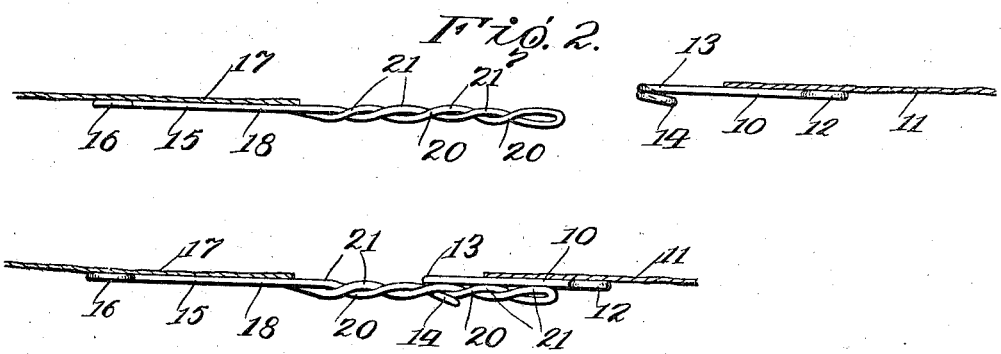
Witnesses
W. N. Woodson
Juana M. Fallin
Inventor
Paul Phillips
By H. A. Macy, Attorneys.

UNITED STATES PATENT OFFICE.

PAUL PHILLIPS, OF ALLENVILLE, ILLINOIS.

SEPARABLE FASTENER.

1,068,530.

Specification of Letters Patent.   Patented July 29, 1913.

Application filed March 9, 1911.   Serial No. 613,454.

*To all whom it may concern:*

Be it known that I, PAUL PHILLIPS, a citizen of the United States, residing at Allenville, in the county of Moultrie and State of Illinois, have invented certain new and useful Improvements in Separable Fasteners, of which the following is a specification.

This invention relates to an improved separable fastener, and has for an object to provide a fastener adaptable to shoes, garments, and to any other use wherein a relatively flat and adjustable device is desired.

Another object of this invention is to provide a light two-piece fastener, the members of which may be adjustably coupled together, and one which, when interlocked, will yield or expand under increased pressure.

The invention further aims to provide a fastener which may be economically made from lengths of wire of adaptable thickness which are twisted and curved into the desired form, and which may be made in various sizes as needed.

For a full understanding of the invention and the merits thereof and also to acquire a knowledge of the details of construction, reference is to be had to the following description and accompanying drawings, in which:

Figure 1 is a plan view of the fastener disclosing the members separated one from the other; Fig. 2 is an edge view of the same; and, Fig. 3 is a similar view disclosing the members interlocked.

Corresponding and like parts are referred to in the following description and indicated in all the views of the drawing by the same reference characters.

Referring to the drawing 10 designates the diverging arms of the catch member of the fastener which are suitably stitched to the flap 11 of a garment, or the like, by the eyes 12 overturned upon the outer ends of the arms 10. The inner ends of the arms 10 are curved inward toward one another, as at 13, and terminate in, and are formed integrally with, the loop or catch 14. The loop 14 is substantially circular and extends back at an acute angle in the direction of, and between, the arms 10 to form the catch. The catch member is relatively flat, as the arms 10 and eyes 12 lie in the same plane, the catch 14 alone having its outer end extending slightly beyond the outer side of the member.

Coöperating with the catch member of the fastener is a loop member, the same comprising diverging arms 15 having eyes 16 overturned upon their outer ends for stitching the loop member upon the opposite flap 17. The inner ends of the arms 15 are turned inward, as at 18, and are twisted loosely about one another to provide a series of loops 19 extending longitudinally in the plane of the loop member. The crossed portions 20 of the loop member form the outer closed ends of the several loops 19, the outermost loop 19 serving as a finger grasp for operating the fastener. The sides of the loops 19 are bent angularly, as at 21, providing springs to admit of the yielding action of the loop member when under increased tension. The diverging of the arms 10 and 15 of the members furthers this spring or yielding action.

In interlocking the members, the flaps 11 and 17 are drawn or pressed together to bring the registering members together. This operation is effected, preferably, by holding the flap 11 rigid with one hand and grasping the outermost loop 19 with the fingers of the opposite hand and drawing the flap 17 over toward the flap 11. The flaps can be contracted, however, as when applied to a shoe, by simply drawing the loop member over toward the catch member with one hand.

It will be noted that the ends 10 of the member 13 are located at a greater distance apart than the transverse breadth of the loops 19. Therefore, when it is desired to disconnect one of the loops 19 from the loop 14 the finger may be passed between the ends 10 of the member 13 and the succession of loops 19 may be pushed inward while the loop 14 is moved toward the portions 15 of the other securing member. This also enables the end loop 21 to lie snugly between the end portions 10 of the member 13 when the parts are in engagement, as shown in Fig. 3.

When the members are brought together and drawn as tight as desired, the adjacent loop 19 is pressed in over the catch 14, the latter binding against the adjacent crossed portions 20 to hold the members in interlocked position. When undue strain is exerted upon the flaps 11 and 17 to separate the same, the spring portions 21 yield or bend and admit of a slight separation of the members. As illustrated, the improved fastener is formed of two lengths of wire which are so bent and twisted as to produce the two members of the fastener.

In the application of this fastener to a shoe, or other device, now requiring a large number of buttons, clasps, or the like, a relatively small number of these separable fasteners is required as the diverging arms 10 and 15 extend over a considerable space of the flaps 11 and 17.

Having thus described the invention, what is claimed is:

A fastener comprising a member formed from wire and having at a point between its ends a succession of crossed portions which constitute loops, the opposite side portions of said loops being free to move with relation to each other, a second member also formed from wire and having at a point between its ends a loop which is disposed at an acute angle to the general plane of the member, the loops upon the first-mentioned member being adapted to receive the loop provided upon the last-mentioned member, whereby the said members are resiliently held in engagement with each other, and the ends of the last-mentioned member being spaced apart for a greater distance than the transverse breadth of the loops upon the first-mentioned member, whereby the fingers may be inserted between the ends of the second mentioned member to disconnect the members.

In testimony whereof, I affix my signature in presence of two witnesses.

PAUL PHILLIPS. [L. S.]

Witnesses:
ANDA F. BURWELL,
FRANCIS C. GRAHAM.